A. W. SPERRY.
KEY-FASTENER.
No. 175,517. Patented March 28, 1876.
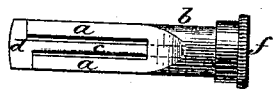
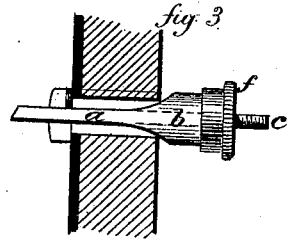

UNITED STATES PATENT OFFICE.

ALFRED W. SPERRY, OF WALLINGFORD, CONNECTICUT.

IMPROVEMENT IN KEY-FASTENERS.

Specification forming part of Letters Patent No. 175,517, dated March 28, 1876; application filed March 9, 1876.

*To all whom it may concern:*

Be it known that I, ALFRED W. SPERRY, of Wallingford, in the county of New Haven and State of Connecticut, have invented new Improvement in Key-Fastener; and I do hereby declare the following, when taken in connection with the accompanying drawings, and the letters of reference marked thereon, to be a full, clear, and exact description of the same, and which said drawings constitute part of this specification, and represent in—

Figure 1, side view; Fig. 2, edge view; Fig. 3, the device as applied to a key-hole.

This invention relates to a device to be introduced into the key-hole of a lock, to prevent the turning or removal of the key from the outside; and it consists in a bifurcated body formed to slip into the key-hole, and with an enlarged end to make a bearing upon the surface, combined with a spindle terminating in a cross-head, and working between the two legs of the body, and a nut to move the said spindle longitudinally, as more fully hereinafter described.

*a a* are the two legs, united to a common head, *b*. These legs are so thin that they will pass freely into any key-hole, and the head of larger dimensions than the width of the key-hole. Between the two legs a spindle, *c*, is introduced, extending through the head and to the end of the legs, where it terminates in a cross-head, *d*. This cross-head at each side of the spindle is beveled in opposite directions, as indicated in Figs. 1 and 2, and the ends of the legs beveled accordingly, the bevel being so that in turning the spindle to the right the cross-head will be brought into a position at right angles to the plane of the two legs, and so as to pass into the slot between the legs. The other end of the spindle is screw-threaded, and a nut, *f*, applied thereto, so that by turning the nut the spindle with the cross-head will be drawn outward, as indicated in broken lines, Fig. 2.

To introduce the fastener, the door is locked and the key turned to the opposite side of the key-hole. Then the fastener is introduced, the cross-head in its position at the end, and in the plane of the two legs, and when the cross-head is within the lock-case the nut is turned to draw out the spindle, and in doing this the cross-head is turned at right angles, and so as to take a bearing upon the inside of the lock-case, as indicated in Fig. 3, and the turning of the nut is continued until the head *b* comes to a bearing upon the surface of the door or escutcheon. The beveled or sharp edges of the cross-head take so firm a hold upon the inside of the case that it cannot be turned without first loosing the nut, and as the legs of the fastener lie in the path of the key, the key cannot be turned to unlock the bolt until the fastener be removed, and this can only be done by loosing the nut and forcing the spindle back until the cross-head will again come into its position in the plane of the two legs.

I claim—

The herein-described key-fastener, consisting of the two legs *a a*, the enlarged body *b*, the spindle *c*, the cross-head *d*, and nut *f*, substantially as described.

ALFRED W. SPERRY.

Witnesses:
JOHN E. EARLE.
CLARA BROUGHTON.